No. 829,020. PATENTED AUG. 21, 1906.
S. LEACH.
EGG POACHER.
APPLICATION FILED APR. 7, 1905.

WITNESSES
E. A. Allen
J. M. Laing

INVENTOR
SAMUEL LEACH
BY
ATTY.

UNITED STATES PATENT OFFICE.

SAMUEL LEACH, OF CHISWICK, ENGLAND.

EGG-POACHER.

No. 829,020.

Specification of Letters Patent.

Patented Aug. 21, 1906.

Application filed April 7, 1905. Serial No. 254,351.

*To all whom it may concern:*

Be it known that I, SAMUEL LEACH, salesman, a subject of the King of Great Britain, residing at 47 Linden Gardens, Chiswick, in the county of London, England, have invented certain new and useful Improvements in or Relating to Egg-Poachers, of which the following is a specification.

This invention relates to appliances for use in poaching eggs, the object being to provide means whereby the egg may be readily freed from adhesion to the poaching vessel or compartment pertaining to the appliance.

In poaching appliances as ordinarily constructed considerable difficulty is experienced after the poaching operation has been accomplished in removing the egg from the vessel, owing to the adhesive character of the egg.

The present invention is designed to obviate the difficulty above referred to, and with this object the vessel pertaining to the poaching appliance is provided with a blade or separator adapted to fit against or in close proximity to the interior of the said vessel, the said blade being pivoted in such a manner that when turned about the pivot the blade will traverse the entire interior surface of the vessel and operate to free the egg from the said surface.

In order that the invention may be clearly understood and readily carried into effect, I will proceed to describe the same with reference to the accompanying drawings, in which—

Figure 1:
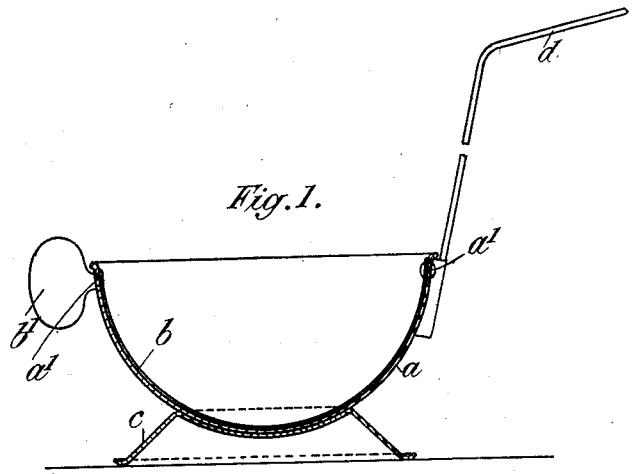
Figure 2:
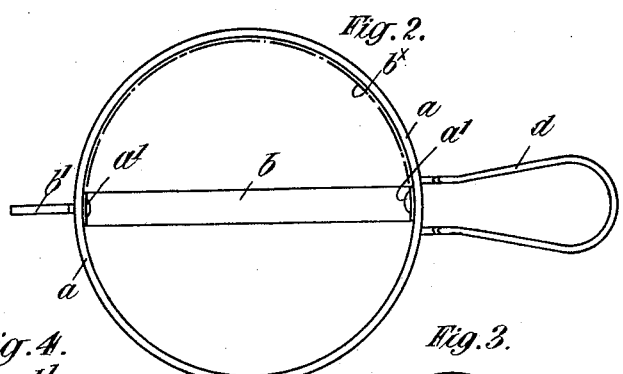
Figure 4:
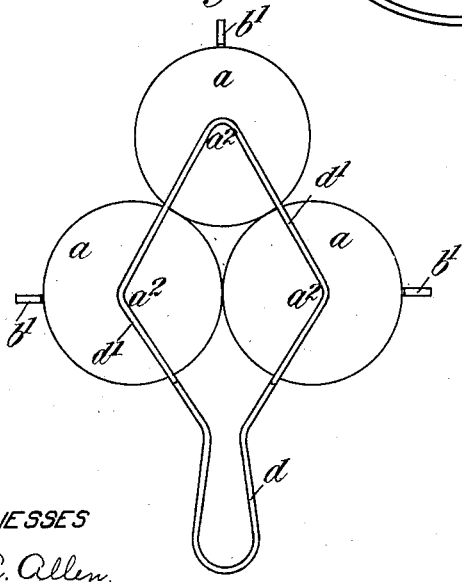
Figure 3:
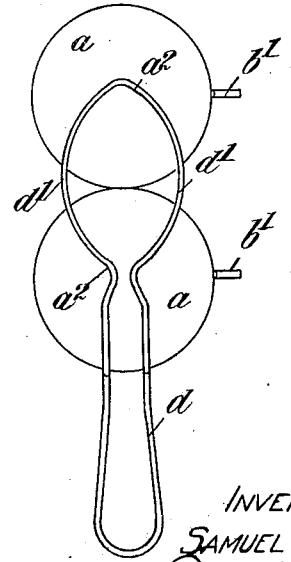

Figure 1 is a section of an appliance for use in poaching eggs having my improvements applied thereto. Fig. 2 is a plan corresponding with Fig. 1. Fig. 3 is a view of the under side of an arrangement in which two vessels are connected together for enabling two eggs to be poached at the same time. Fig. 4 is a view of the under side, illustrating an arrangement whereby three eggs may be poached at the same time.

The appliance comprises a cup or body $a$ of approximately hollow hemispherical form, in which the egg is deposited for the purpose of being poached or boiled. Near the mouth or open portion of the cup and at diametrically opposite points is pivoted, as at $a'\ a'$, a blade or separator $b$, adapted to conform to the interior surface of the cup or body $a$, so that when turned about the pivots the said blade will sweep over or close against the said interior surface of the cup or body.

$b'$ is a thumb-piece, whereby the blade or separator may be turned about the pivots $a'\ a'$.

The cup or body may be constructed of metal or other suitable material, and the blade or separator may also be composed of metal. The cup or body in the form illustrated in Fig. 1 is preferably provided with a foot-base or stand, as at $c$, whereby the appliance may be enabled to take a firm seating on the bottom of the saucepan or other utensil, the appliance being, moreover, provided with a handle, as at $d$, for inserting or withdrawing the same in or from the said utensil or otherwise manipulating the poacher.

In the constructions illustrated, respectively, in Figs. 3 and 4 the handle $d$ is preferably continued beneath the cups or bodies $a$ and bent in such a manner as to constitute the foot-base or stand, as at $d'$, the said wire serving to connect the several cups or bodies $a$ by being soldered or otherwise secured to the under side of each cup or body, as at $a^2$. As will be readily understood, each cup or body $a$ is provided with a blade or separator $b$ and a turning-piece $b'$.

The mode of operating the appliance will be apparent. Assuming an egg is about to be poached, the blade is turned, so as to assume the position indicated in broken lines at $b^\times$ in Fig. 2. The egg is then placed or deposited in the cup or body $a$, and after being subjected to the required action the appliance is withdrawn from the saucepan or other utensil and the blade $b$ turned to a corresponding position on the opposite side of the cup or body to that indicated in broken lines in Fig. 2. This movement of the blade will have the effect of entirely freeing the egg from the interior surface of the vessel, and the egg may then be turned out in a whole or perfect condition, all difficulty incidental to the usual methods of freeing the egg being obviated.

What I claim, and desire to secure by Letters Patent of the United States, is—

1. In combination, a receptacle; a blade, shaped to conform to said receptacle, secured to the side walls of the latter by pivots extending transversely of the said walls and means for manipulating said blade whereby it may be swung perpendicularly relatively to said receptacle.

2. In combination, a substantially semispherical receptacle; a blade secured to said receptacle by pivots passing transversely through opposite portions thereof and of the wall of said receptacle; and means for manipulating said blade to cause the same to move perpendicularly relatively to said receptacle.

3. In combination, a receptacle having a base for supporting the same and a handle; a blade pivoted to said receptacle at opposite sides of the latter; and means for manipulating said blade so as to swing the same across said receptacle from the top edge at one side to the top edge at the other side.

In testimony whereof I have hereunto set my hand, in presence of two subscribing witnesses, this 18th day of March, 1905.

SAMUEL LEACH.

Witnesses:
F. J. RAPSON,
E. W. JOHNSON.